United States Patent
Harada et al.

(10) Patent No.: US 6,709,143 B2
(45) Date of Patent: Mar. 23, 2004

(54) LIGHT DIFFUSION SHEET AND BACKLIGHT UNIT USING THE SAME

(75) Inventors: Kenichi Harada, Gobo (JP); Hitoshi Masaki, Hidaka-gun (JP)

(73) Assignee: Keiwa Kabushiki Kaisha, Osaka (JP)

( * ) Notice: Subject to any disclaimer, the term of this patent is extended or adjusted under 35 U.S.C. 154(b) by 0 days.

(21) Appl. No.: 10/080,460

(22) Filed: Feb. 22, 2002

(65) Prior Publication Data

US 2002/0114169 A1 Aug. 22, 2002

(30) Foreign Application Priority Data

Feb. 22, 2001 (JP) .................................. 2001-046673
Sep. 13, 2001 (JP) .................................. 2001-278033

(51) Int. Cl.$^7$ ............................. F21V 11/16; F21V 5/00
(52) U.S. Cl. ....................... 362/558; 362/330; 362/333; 362/355; 359/599
(58) Field of Search ................ 359/582, 599; 362/31, 330, 333, 355, 558; 349/64, 65

(56) References Cited

U.S. PATENT DOCUMENTS

| | | | |
|---|---|---|---|
| 3,832,315 A | * | 8/1974 | Bueche ........................ 524/848 |
| 4,053,208 A | * | 10/1977 | Kato et al. .................. 362/330 |
| 5,706,134 A | * | 1/1998 | Konno et al. ................ 359/599 |
| 5,903,391 A | * | 5/1999 | Toshima et al. ............. 359/599 |
| 5,995,288 A | * | 11/1999 | Kashima et al. ............. 359/599 |
| 6,111,699 A | * | 8/2000 | Iwata et al. ................. 359/599 |
| 6,217,176 B1 | * | 4/2001 | Maekawa .................... 359/599 |

* cited by examiner

*Primary Examiner*—Alan Cariaso
(74) *Attorney, Agent, or Firm*—Marshall, Gerstein & Borun LLP

(57) ABSTRACT

A light diffusion sheet comprising a transparent base material sheet; a light diffusion layer laminated on a surface of the base material sheet and containing beads dispersed within a binder; and a sticking-inhibiting layer laminated on a rear face of the base material sheet, wherein the binder of the light diffusion layer contains a thermosetting resin and the sticking-inhibiting layer is a resin layer containing an ionizing radiation curable resin. In the light diffusion sheet of the invention, which employs an ionizing radiation curable resin for the binder of the sticking-inhibiting layer, the cross-linking density of the binder can be increased, whereby the wear resistance of the sticking-inhibiting layer as well as the wear resistance of the rear face of the light diffusion sheet can be increased. Further, possible occurrence of scratches in the sticking-inhibiting layer, which is attributable to the contact between the sticking-inhibiting layer and the beads of the light diffusion layer, can be effectively avoided.

24 Claims, 5 Drawing Sheets

PRIOR ART

PRIOR ART

LIGHT DIFFUSION SHEET AND BACKLIGHT UNIT USING THE SAME

FIELD OF THE INVENTION

The present invention relates to a light diffusion sheet for use in a backlight unit incorporated in a liquid crystal display (LCD) and to a backlight unit using a light diffusion sheet.

BACKGROUND OF THE INVENTION

In the field of LCDs, backlight systems have been widely utilized for illuminating a liquid crystal layer from its back for light emission. A known LCD has a backlight unit placed on the underside of a liquid crystal layer. Such a backlight unit 20 is generally comprised of, as shown in FIG. 8, a bar-like lamp 21 (light source); a light guide plate 22, in the form of a square plate, placed with one end extending along the lamp 21; a light diffusion sheet 23 placed on the surface of the plate 22; and a prism sheet 24 placed on the surface of the sheet 23.

In the backlight unit 20, light beams (ray) emitted from the lamp 21 and incident on the plate 22 are reflected off the side faces of the plate 22 and reflective dots or a reflective sheet (not shown) on the rear face of the plate 22 and then go out of the surface of the plate 22. The light beams (ray) transmitted from the plate 22 are incident on the sheet 23, diffused, and then, go out of the surface of the sheet 23. Thereafter, the light beams from the sheet 23 are transmitted to the prism sheet 24 and then allowed by a prism section 24a formed on the surface of the sheet 24 to go out as light beams that form a distribution with a peak at an upward direction substantially normal to the sheet 24. The light beams from the lamp 21 are diffused by the sheet 23 and, then, refracted by the sheet 24 so as to form a distribution peak at an upward direction substantially normal to the sheet 24 to illuminate the entire surface of the liquid crystal layer (not shown) disposed in an upper position.

With reference to FIG. 9, there is provided another type of backlight unit 20 which is designed, in view of the light collecting properties of the prism sheet 24, such that another light diffusion sheet 23 or prism sheet is disposed on the surface of the sheet 24.

The known light diffusion sheet 23 commonly employed in the backlight unit 20 comprises, as shown in FIG. 10, a light diffusion layer 26 containing beads 29 dispersed within a binder 28; a transparent base material sheet 25; and a sticking-inhibiting layer 27 containing beads 31 dispersed within a binder 30, light diffusion layer 26, base material sheet 25 and sticking-inhibiting layer 27 are laminated in this order.

The binder 30 used for the sticking-inhibiting layer 27 is poor in wear resistance and liable to scratch defects. In addition, since the beads 31 are dispersed in the binder 30, there is a risk that the rear face of the light diffusion sheet 23 is easily damaged or deformed, resulting in depreciation of its commercial value, if a plurality of light diffusion sheets 23 are stacked together on top of one another during manufacture, delivery, storage, and the like, of the light diffusion sheets or if the light diffusion sheet 23 is laid over the irregular surface of the prism sheet, when incorporated into the backlight unit 20.

SUMMARY OF INVENTION

The present inventors have made the present invention in consideration of the problems realized in the prior art by intensively investigating the materials to be employed in the light diffusion layer and sticking-inhibiting layer of the light diffusion sheet. Specifically, an object of the invention is to provide a light diffusion sheet comprising a transparent base material sheet; a light diffusion layer laminated on a surface of the base material sheet and containing beads dispersed within a binder; and a sticking-inhibiting layer laminated on a rear face of the base material sheet, wherein the binder of the light diffusion layer contains a thermosetting resin and the sticking-inhibiting layer is a resin layer containing an ionizing radiation curable resin In the light diffusion sheet of the invention, which employs an ionizing radiation curable resin for the binder of the sticking-inhibiting layer, the cross-linking density of the binder can be increased, whereby the wear resistance of the sticking-inhibiting layer as well as the wear resistance of the rear face of the light diffusion sheet can be increased. Further, possible occurrence of scratches in the sticking-inhibiting layer, which is attributable to the contact between the sticking-inhibiting layer and the beads of the light diffusion layer, can be effectively avoided. According to the invention, even if a plurality of light diffusion sheets, which have the light diffusion layer containing beads dispersed within the binder or projecting from the surface of the binder, are stacked together on top of one another during delivery or other occasions, scratch defects can be effectively prevented in the sticking-inhibiting layer located on the rear face of the light diffusion sheet, with the result that degradation of optical properties such as decreases in light beam transmissivity caused by scratches in the sticking-inhibiting layer can be avoided and therefore desired optical properties can be ensured.

In addition, beads may be dispersed within the sticking-inhibiting layer in order to enhance light diffusibility.

According to a preferred embodiment of the invention, the light diffusion sheet may further contain a wax whose particles are dispersed within the light diffusion layer and/or the sticking-inhibiting layer. Specifically, in the light diffusion sheet of this embodiment, light beams (ray) passing through the interfaces of the particles of the wax dispersed within the binder of the light diffusion layer are refracted in various directions, so that not only improved light diffusibility can be achieved but also scratch defects caused by the contact between the sheet surfaces when the light diffusion sheets are used in a stacked condition can be prevented. The particles of the wax dispersed within the binder are melted by a pressure or friction heat that acts upon the surface of the light diffusion sheet, so that they are present on the surface of the light diffusion sheet as a lubricant oil or crystallized extending in various directions according to the force acting on the surface of the light diffusion sheet. As a result, slippage, blocking resistance, and wear resistance are imparted to the light diffusion sheet, increasing the scratch prevention capability of the sheet.

According to another preferred embodiment of the invention, the light diffusion sheet may further include a micro inorganic filler whose particles are dispersed within the light diffusion layer and/or the sticking-inhibiting layer. More specifically, the light diffusion sheet of this embodiment contains not only beads but also a micro inorganic filler within the light diffusion layer and/or the sticking-inhibiting layer, so that the apparent crystallinity and therefore heat resistance of the light diffusion sheet can be improved. Consequently, the deflection of the light diffusion sheet when the lamp is lit can be restricted.

According to the invention, there is provided a backlight unit for use in a liquid crystal display, the unit comprising a lamp; a light guide plate disposed beside the lamp for guiding light beams to the front side of the light guide plate, the light beams having been emitted from the lamp; and a light diffusion sheet disposed on the front side of the light guide plate. The use of the light diffusion sheet of the invention enables it to assure improved wear resistance, heat resistance and the like, to prevent scratch defects and to remarkably facilitate handling of not only the light diffusion sheet but also the backlight unit during manufacture, delivery, storage and other occasions.

PREFERRED EMBODIMENTS OF THE INVENTION

With reference to the accompanying drawings, embodiments of the invention will be hereinafter described in detail.

Figure 1:
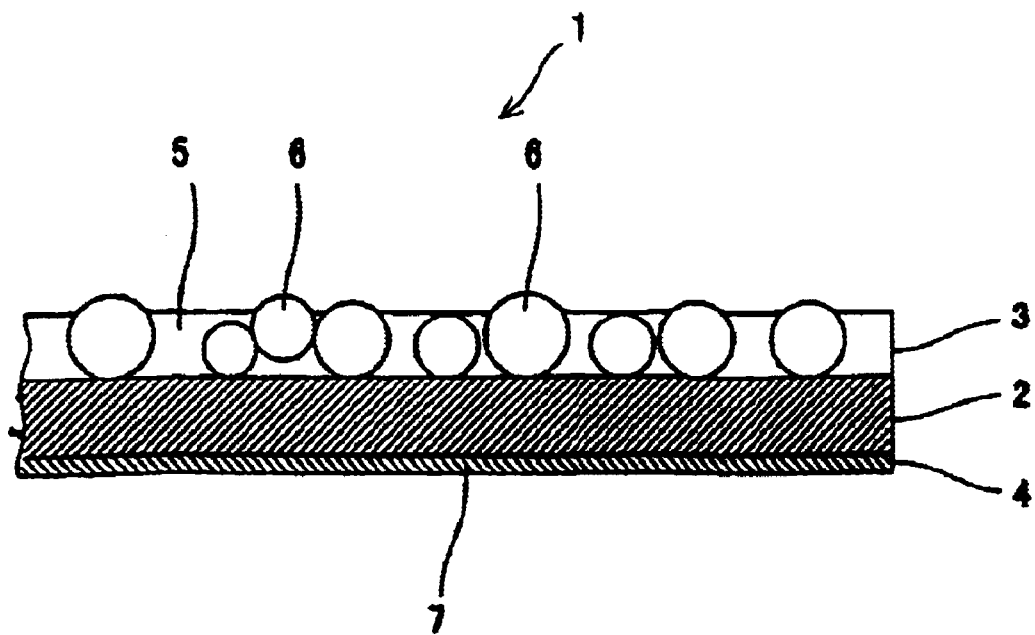
FIG. 1 diagrammatically shows a section of a light diffusion sheet according to one embodiment of the invention.

Referring to FIG. 1, a light diffusion sheet 1 of the invention is generally comprised of a base sheet 2, a light diffusion layer 3 laminated on the front face of the base sheet 2, and a flat sticking-inhibiting layer 4 laminated on the rear face of the base sheet 2.

The base sheet 2 needs to be permeable to light beams (ray) and is therefore formed from a transparent synthetic resin, particularly, colorless transparent synthetic resin. The synthetic resin used for the base sheet 2 is not particularly limited, but such resin may include polyethylene terephthalate, polyethylene naphthalate, acrylic resin, polycarbonate, polystyrene, polyolefin, cellulose acetate and weather-resistant vinyl chloride. The thickness of the base sheet 2 is not particularly limited, but may be within the range of from about 10 μm to about 500 μm and more preferably within the range of from about 75 μm to about 250 μm for the following reason. If the thickness of the base sheet 2 is below the above noted range, curling is likely to occur when a resin component used for forming the light diffusion layer 3 is applied to the base sheet 2. On the other hand, if the thickness of the base sheet 2 exceeds the above noted range, the brightness of the liquid crystal display will decrease and the thickness of the backlight unit will increase which does not meet the demand towards thin liquid crystal displays.

The light diffusion layer 3 is comprised of a binder 5 and beads 6 dispersed within the binder 5. As a polymer contained in the binder 5, any curable resins are applicable, but thermosetting resin is preferred for use in the invention in light of easy handling and availability. Such thermosetting resin used for the invention may includes urea resin, melamine resin, phenol resin, epoxy resin, unsaturated polyester resin, alkyd resin, urethane resin, acrylic resin, polyurethane, fluorocarbon resin, silicon resin, and polyamide imide. The binder 5 may contain, in addition of the above-noted polymer, a plasticizer, stabilizer, degradation inhibitor, dispersing agent and the like. The binder 5 needs to be permeable to light beams and therefore should be transparent. More preferably, the binder 5 is colorless and transparent.

The beads 6 are substantially spherical in shape. Examples of the material of the beads 6 may include acrylic resin, polyurethane, polyvinyl chloride, polystyrene, polyacrylonitrile and polyamide. The beads 6 are preferably transparent and more preferably transparent and colorless in order to allow a large quantity of rays to pass through the light diffusion sheet 1.

The particle size of the beads 6 is preferably within the range of from about 0.1 μm to about 100 μm and more preferably within the range of from about 1 μm to about 50 μm. The reason for this is that if the particle size of the beads 6 is below the above-noted range, an unsatisfactory diffusion effect is obtained and if the particle size exceeds the above range on the other hand, coating with the resin component of the light diffusion layer 3 becomes difficult.

The particle size of the beads is obtained by measuring, with a microscope, the diameters of one hundred bead particles 6 extracted at random and then simply averaging the measured values. If the beads 6 have not a spherical shape, the particle size of the beads 6 is determined by averaging values obtained by averaging the size of each bead 6 in a first arbitrary direction and the size of the bead 6 in a second direction perpendicular to the first direction.

The amount of the beads 6 contained in the light diffusion layer 3 is preferably between about 0.1 and about 500 parts by weight and, more preferably, between about 10 and about 300 parts by weight, per 100 parts of the polymer contained in the binder 5. The reason for this is that if the amount of the beads 6 is below the above-noted range, an unsatisfactory diffusion effect is obtained and if the amount exceeds the above range on the other hand, coating with the resin component of the light diffusion layer 3 becomes difficult.

Figure 2:
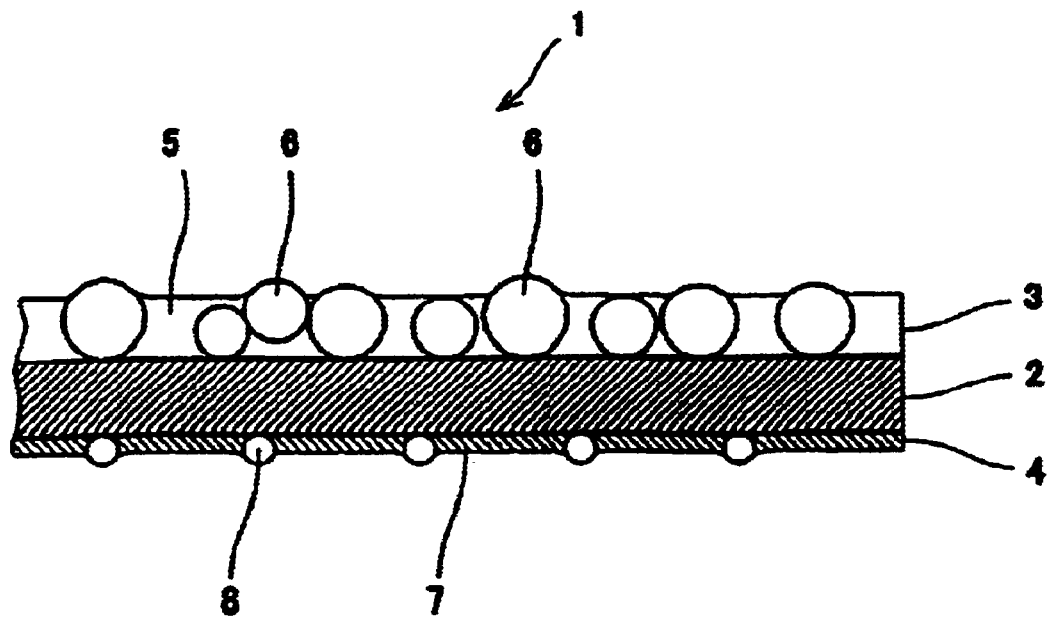
FIG. 2 diagrammatically shows a section of a light diffusion sheet according to another embodiment of the invention.

The sticking-inhibiting layer 4 is formed from a binder 7. The binder 7 is formed from an ionizing radiation curable resin which is a resin capable of forming a relatively compact film (i.e., a film having high cross-linking density), for the purpose of preventing scratch defects from occurring in the sticking-inhibiting layer 4. As shown in the diagrammatic sectional view (FIG. 2) which illustrates another embodiment of the light diffusion sheet of the invention, the sticking-inhibiting layer 4 may contain beads 8 dispersed therein together with the binder 7. In this case, the light diffusion sheet 1 is prevented from sticking to a light guide plate (not shown) adjacent the sheet 1 by the beads 8 projecting from the binder 7. Where the sticking-inhibiting layer 4 is formed from the binder 7 according to the invention, since the rear face of the light diffusion sheet 1 is coated with the highly wear resistant binder 7, scratches can be prevented from occurring in the rear faces of the light diffusion sheets 1 when stacked together on top of one another. It should be noted that the same beads as the beads 6 used for the light diffusion layer 3 may be employed as the beads 8.

The ionizing radiation curable resin, which constitutes the binder 7, is a general term for resins formed by curing an ionizing radiation curable coating material by means of electron beam irradiation or ultraviolet ray irradiation, the ionizing radiation curable coating material containing a photopolymerized prepolymer, photopolymerized monomer or photopolymerized initiator. Electron beam curable resin and ultraviolet-curable resin are applicable to the invention.

Of these resins, ultraviolet-curable resin is preferable for the invention in view of easy handling and availability. The glass-transition temperature (Tg) of the ultraviolet-curable resin to be used preferably ranges from about 10° C. to about 150° C.

When an ultraviolet-curable resin prepared so as to have a glass-transition temperature (Tg) of about 20° C. to about 50° C. is used for forming the binder 7, the hardness of the sticking-inhibiting layer 4 can be comparatively reduced. With this arrangement, damage to the sticking-inhibiting layer 4 due to the contact with other sheets such as the prism sheet can be easily avoided when the light diffusion sheet 1 is used in a backlight unit. Additionally, when other sheets and the light diffusion sheet 1 are incorporated into a backlight unit in a stacked condition, not only can degradation of the optical properties of the backlight unit be prevented, but also maintenance of the desired optical properties can be facilitated, by protecting the other sheets from damage.

The use of an ultraviolet-curable resin prepared so as to have a glass-transition temperature (Tg) of about 50° C. to 150° C. for forming the binder 7 makes the hardness of the sticking-inhibiting layer 4 relatively higher. By virtue of this arrangement, the wear resistance of the sticking-inhibiting layer 4 can be more reliably increased and where the light diffusion sheet 1 is used for a backlight unit, damage to the sticking-inhibiting layer 4 due to the contact with other sheets can be positively avoided.

As the ultraviolet-curable resin constituting the binder 7, those of (a) radical polymerized resin such as epoxy acrylate, urethane acrylate and melamine acrylate; (b) photoaddition polymerization type polythiol polyene resin; (c) photo cationic polymerization type resin can suitably be used. The binder 7 may contain, for example, a plasticizer, stabilizer, degradation inhibitor, dispersing agent, antistatic agent, or other components known to one skilled in the art. In addition, the binder 7 needs to be permeable to light beams and is, therefore, preferably transparent and more preferably colorless and transparent.

In the light diffusion sheet 1 shown in FIG. 1, the sticking-inhibiting layer 4 does not include beads but is formed from the binder 7 alone, so that improved light beam (ray) transmissivity can be achieved. For enhancing light diffusibility, beads may be dispersed in the sticking-inhibiting layer 4.

Wax

Figure 3:
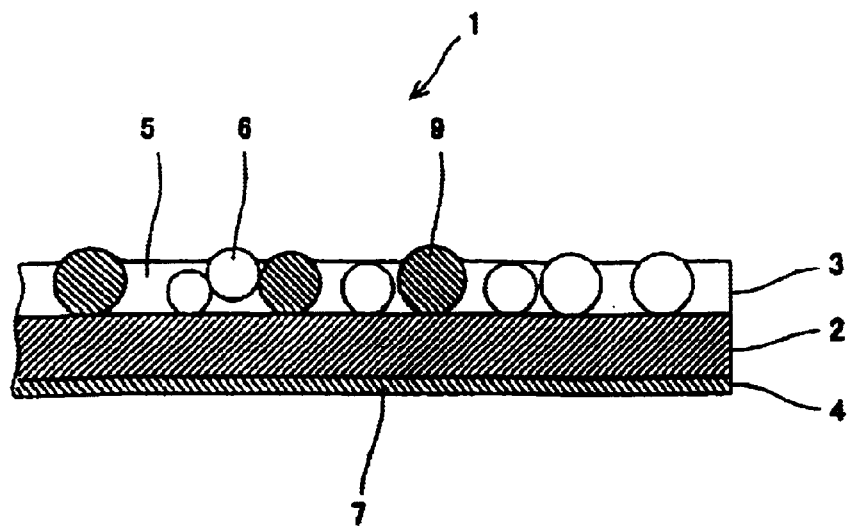
FIG. 3 diagrammatically shows a section of a light diffusion sheet according to still another embodiment of the invention, in which a wax is used.

Referring to FIG. 3, there is provided a light diffusion sheet according to another embodiment of the invention which comprises, within the binder of the light diffusion layer, a wax 9 in addition to the beads 6. Specifically, light beams passing through the light diffusion layer 3 from its back to its front side can be uniformly diffused by refraction and reflection occurring at the interface of the wax 9 whose particles are dispersed within the binder 5 of the light diffusion layer 3. Further, light beams can be more effectively diffused by allowing the upper ends of the particles of the wax 9 to project from the binder 5 or by embedding the wax 9 in the binder 5. The thickness of the light diffusion layer 3 (i.e., thickness to be made by applying the binder 5 and subtracting therefrom the thickness of the wax 9 and the beads 6) is not particularly limited, but may be, for example, within the range of from about 1 $\mu$m to about 30 $\mu$m.

The term "wax" used herein is defined by organic substances having alkyl groups which are solid or semi-solid at room temperature, dissolved at a certain temperature and low in viscosity. The wax is classified into three groups: natural wax, synthetic wax and compounded wax. Since the wax is an organic substance having alkyl groups which are solid or semi-solid at room temperature, dissolved at a certain temperature, and low in viscosity, scratch preventing capability can be imparted to the light diffusion sheet 1.

Wax 9 is not limited to particular materials but may be selected from natural wax, synthetic wax and compounded wax. The natural wax is further classified into four groups: a plant group such as Japan tallow; an animal group such as bees wax; a mineral group such as montan wax, and a petroleum group such as paraffin wax. The synthetic wax is classified into four groups: a synthetic hydro carbon group such as polyethylene wax; a denatured wax group such as paraffin wax derivatives; a hydride wax group such as hardened castor oil; and a fatty acid group such as stearic acid amide.

Polyethylene wax, polypropylene wax and polytetrafluoroethylene wax are suitably used as the wax of the invention and at least one kind of wax selected from these waxes may be used. Since such polyethylene wax is composed of low-molecular-weight polyethylene (molecular weight=1,000 to 10,000) and has a relatively high melting point of 100° C. to 130° C., it imparts excellent scratch preventing capability to the light diffusion sheet.

In addition, polypropylene wax is harder and has a higher melting point than polyethylene wax and therefore gives better scratch preventing capability. Polytetrafluoroethylene wax has an extremely high melting point of about 370° C., so that it increases scratch preventing capability to a considerable extent. It is particularly desirable to use at least one wax selected from the group consisting of polyethylene wax, polypropylene wax and polytetrafluoroethylene wax. These waxes have melting points ranging from about 100° C. to about 400° C. and are therefore infusible by heat generated from the lamp when the backlight unit is in service. Accordingly, where a plurality of light diffusion sheets are used in a stacked condition, the waxes are melted and deformed, exerting scratch preventing capability only when some external force acts on the surfaces of the light diffusion sheets.

Figure 4A:
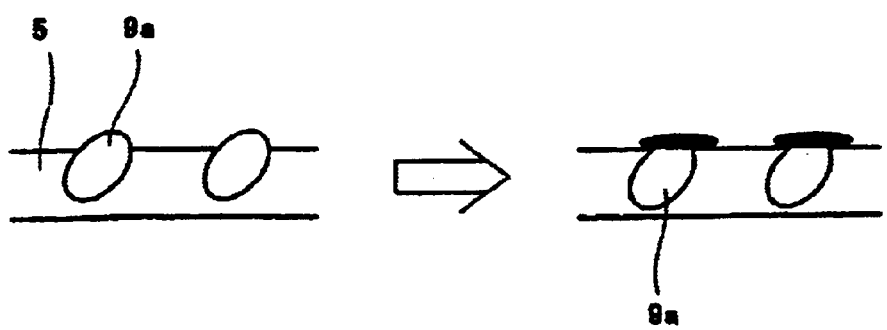
FIGS. 4(a) and 4(b) diagrammatically show a mechanism for preventing scratches in the light diffusion sheet by use of a wax.
Figure 4B:
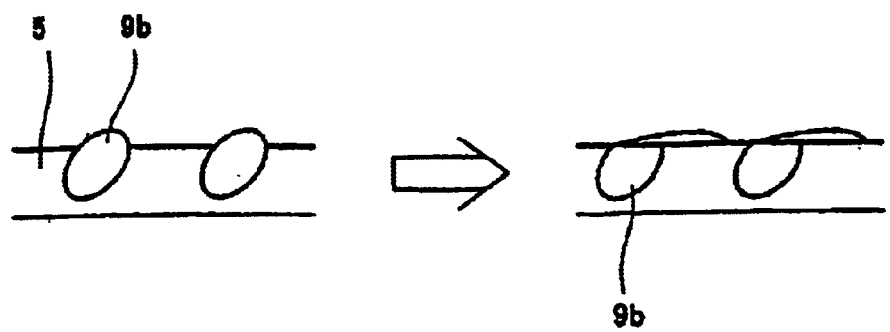

The mechanism for preventing scratches by the wax 9 is thought to be formed such that, as shown in FIG. 4(a), a wax 9a is melted, by a pressure and friction heat working on the surface of the light diffusion sheet 1, into a liquid which is, in turn, present on the surface of the light diffusion sheet 1 in a condition like lubricant. The liquefied wax 9a is crystallized on the surface of the light diffusion sheet 1, thereby protecting the surface of the sheet. In the case of a high-melting-point wax 9b on the other hand, it is conceivable that the portions of the particles of the wax 9b, which project from the light diffusion sheet surface, extend in a direction that an external force acts on the light diffusion sheet surface, being crystallized as shown in FIG. 4(b). Accordingly, the particles of the wax 9 may be allowed to project from the outer surface of the binder in order to let such a scratch prevention mechanism function effectively. Use of polyethylene wax or the like which realizes the mechanism shown in FIG. 4(a) in combination with polytetrafluoroethylene or the like which realizes the mechanism shown in FIG. 4(b) is particularly effectual.

The amount of the wax 9 contained in the binder 5 is preferably within the range of from about 0.1 wt % to about 10 wt % and more preferably within the range of from about 0.5 wt % to about 5 wt % based on the amount of the binder 5. The reason for this is that if the amount of the wax 9 is below the above range, satisfactory scratch preventing capability cannot be expected, whereas if the amount of the wax 9 exceed the above range, there is some fear of decreased light beam transmissivity.

The average particle size of the wax 9 ranges from about 100 nm to about 50 $\mu$m and more preferably from about 1 $\mu$m to about 25 $\mu$m, because if the average particle size of the wax 9 is below the above range, dispersion of the wax particles within the binder 5 becomes difficult, whereas if the average particle size exceeds the above range, it will give arise to undesirable situations such as a decrease in light beam transmissivity and a decrease in the intensity of the light diffusion layer 3.

Although the beads 6 dispersed within the binder 5 form irregularity in the surface of the light diffusion sheet, occurrence of scratches in the contact surfaces of the light diffusion sheets when stacked together on top of one another can be restricted, because the wax whose particles are dispersed together with the beads 6 functions to prevent scratches from occurring in the light diffusion sheets.

Figure 5:
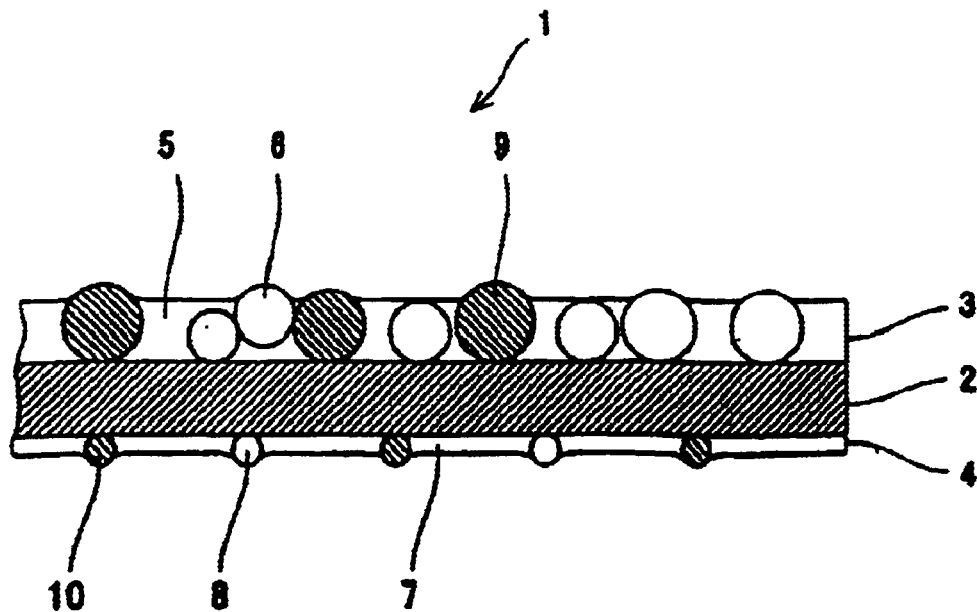
FIG. 5 diagrammatically shows a section of a light diffusion sheet according to another embodiment of the invention, in which waxes are used.

Referring to FIG. 5, the particles of a wax 10 is dispersed together with the beads 8 within the sticking-inhibiting layer 4. This embodiment has the following effects: (i) not only sticking to the light guide plate due to the wax 10 but also scratching caused by the contact between the light diffusion sheets be prevented; and (ii) light diffusibility can be enhanced by the refraction and reflection of light beams at the interface of the wax 10.

Further, sticking inhibition can be improved by the beads dispersed within the sticking-inhibiting layer. In addition, a wax can be dispersed both in the light diffusion layer and in the sticking-inhibiting layer. In this case, the scratching preventing capability of the light diffusion sheet can be further increased.

Micro Inorganic Filler

Figure 6:
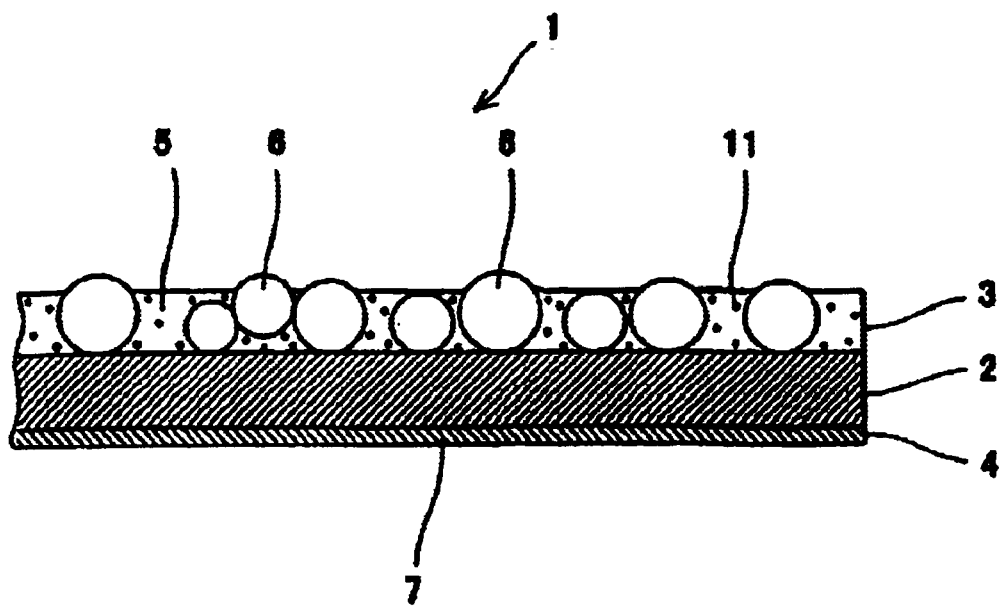
FIG. 6 diagrammatically shows a section of a light diffusion sheet according to an embodiment of the invention, in which a micro inorganic filler is used.

Referring to FIG. 6, there is provided a light diffusion sheet 1 according to another embodiment of the invention, in which the binder 5 of the light diffusion layer 3 includes a micro inorganic filler 11 in addition to the beads 6. More concretely, the apparent crystallinity of the light diffusion sheet 1 is increased by dispersing the micro inorganic filler 11 in the binder 5, so that the heat resistance of the light diffusion sheet 1 can be increased and the deflection of the sheet 1 caused by heat generated when the lamp is lit can be restricted. Since the beads 6 are also dispersed within the binder 5, light beams passing through the light diffusion layer 3 from its back to its front side can be uniformly diffused. The upper ends of a part of beads 6 project from the binder 5 and therefore the light beams can be more uniformly diffused The thickness of the light diffusion layer 3 (i.e., thickness to be made by applying the binder 5 and subtracting therefrom the thickness of the beads 6) is not particularly limited but may be, for example, within the range of from about 10 $\mu$m to about 30 $\mu$m.

Although the reason why the apparent crystallinity of the light diffusion sheet 1 can be improved by dispersion of the micro inorganic filler 11 remains unknown, it is presumed that the micro inorganic filler 11 has the same behavior as that of the crystal portion of the crystalline polymer so that the thermal movement of the chain of the polymer used for the binder is prevented.

Such micro inorganic filler 11 may includes colloidal silica, smectite, colloidal calcium carbonate and mica. Of these substances, colloidal silica is preferable because even if agitation of the resin component constituting the light diffusion layer 3 is interrupted, the viscosity of the resin component will not drastically increase and therefore preparation and application of the resin component can be easily carried out.

For preventing the loss of light beams which pass through the light diffusion sheet 1, it is preferable to use the micro inorganic filler 11 having a small average particle diameter. Concretely, the average particle diameter of the filler 11 may be less than about 1 $\mu$m, and preferably about 400 nm or less which is equal to or less than the wavelength of visible light. More preferably, the average particle diameter is about 50 nm or less for the reason that with this range, the light diffusion sheet 1 can be prevented from turning cloudy in pale color under the influence of shorter wavelength. The better, the smaller the average particle diameter of the micro inorganic filler 11 is. Therefore, the lower limit of the average particle diameter is not particularly limited, but the average particle diameters of commonly available micro inorganic fillers 11 are greater than about 5 nm. The average particle diameter of the micro inorganic filler 11 is obtained by measuring the diameters of one hundred particles of the micro inorganic filler 11, which have been extracted at random, by enlargement with a microscope and simply averaging the measured values. If the particles of the micro inorganic filler 11 are not spherical in shape, the size of each particle in a first arbitrary direction and the size of the particle in a second direction perpendicular to the first direction are averaged to obtain the particle diameter of the particle of the micro inorganic filler 11.

The amount of the micro inorganic filler 11 contained in the light diffusion layer 3 is preferably between about 10 and about 500 parts by weight and more preferably between about 10 and about 200 parts by weight, per 100 parts of the polymer of the binder 5. If the amount is below the above range, the thermal deformation of the light diffusion sheet 1 cannot be satisfactorily prevented in some cases. On the other hand, if the amount exceeds the above range, application of the resin component which constitutes the light diffusion layer 3 becomes difficult.

Figure 7:
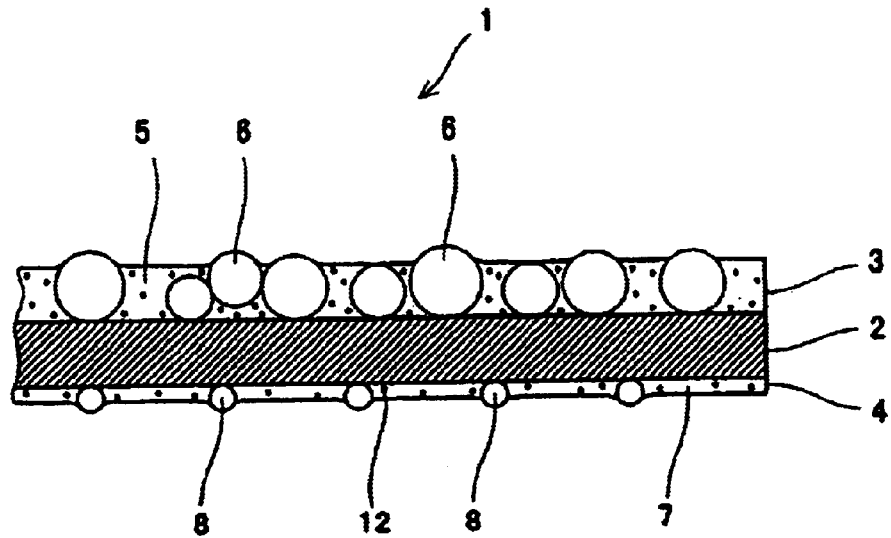
FIG. 7 diagrammatically shows a section of a light diffusion sheet according to another embodiment of the invention, in which micro inorganic fillers are used.

With reference to FIG. 7, according to the invention, the beads 8 and a micro inorganic filler 12 may be dispersed within the binder 7 of the sticking-inhibiting layer 4. By dispersing the micro inorganic filler 12 within the sticking-inhibiting layer 4, the apparent crystallinity of the light diffusion sheet 1 can be increased. Accordingly, the heat resistance of the light diffusion sheet 1 can be increased and therefore the deflection of the sheet 1 due to heat generated when the lamp is lit can be restricted.

The thickness (the thickness to be made by applying the binder 5 and subtracting therefrom the thickness of the beads 8) of the sticking-inhibiting layer 3 is not particularly limited, but may be, for example, within the range of from about 1 $\mu$m to about 10 $\mu$m.

Since the amount of the beads 8 is relatively small, the beads 8 are dispersed, being apart from one another within the binder 7. The lower ends of most of the beads 8 project from the binder 7. This prevents the light diffusion sheet 1 from sticking to, for example, the light guide plate and, in consequence, nonuniformity in the brightness of the screen of the liquid crystal display can be restricted.

In FIG. 6, the particles of the micro inorganic filler 11 are dispersed only within the light diffusion layer 3 in the light diffusion sheet 1. It is also possible to disperse the particles of the micro inorganic fillers 11 and 12 in both of the light diffusion layer 3 and the sticking-inhibiting layer 4 as shown in FIG. 7. Alternatively, the particles of the micro inorganic filler 12 may be dispersed only within the sticking-inhibiting layer 4. Of course, the dispersion of the micro inorganic fillers 11, 12 in both of the light diffusion layer 3 and the sticking-inhibiting layer 4 is preferable because the deflection of the light diffusion sheet 1 can be more positively restricted.

Application to a Backlight Unit

Figure 8:
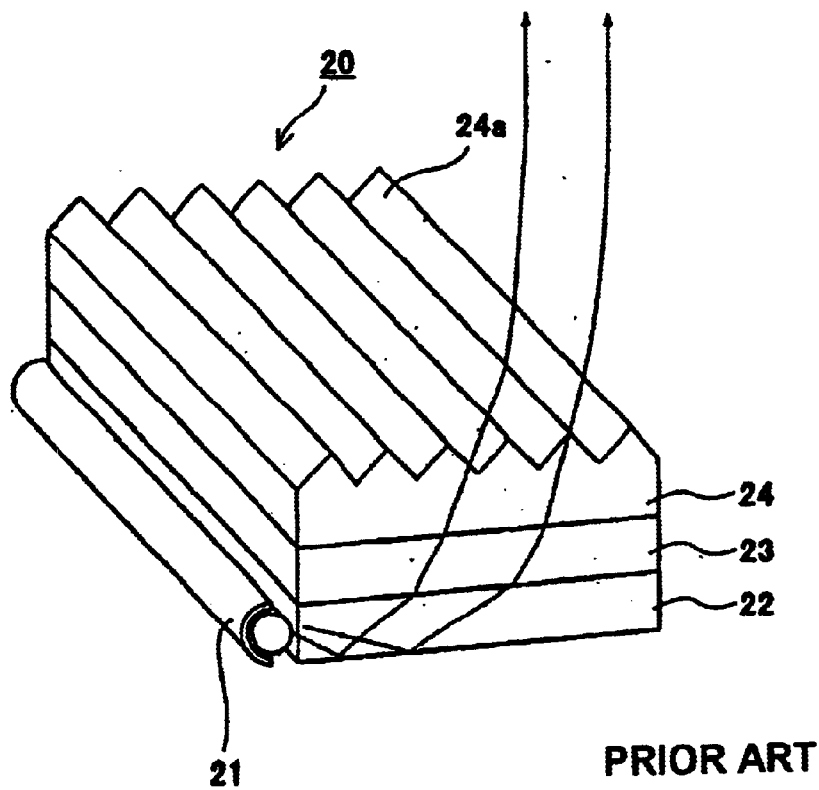
FIG. 8 diagrammatically shows a perspective view of a structure of a common backlight unit.
Figure 9:
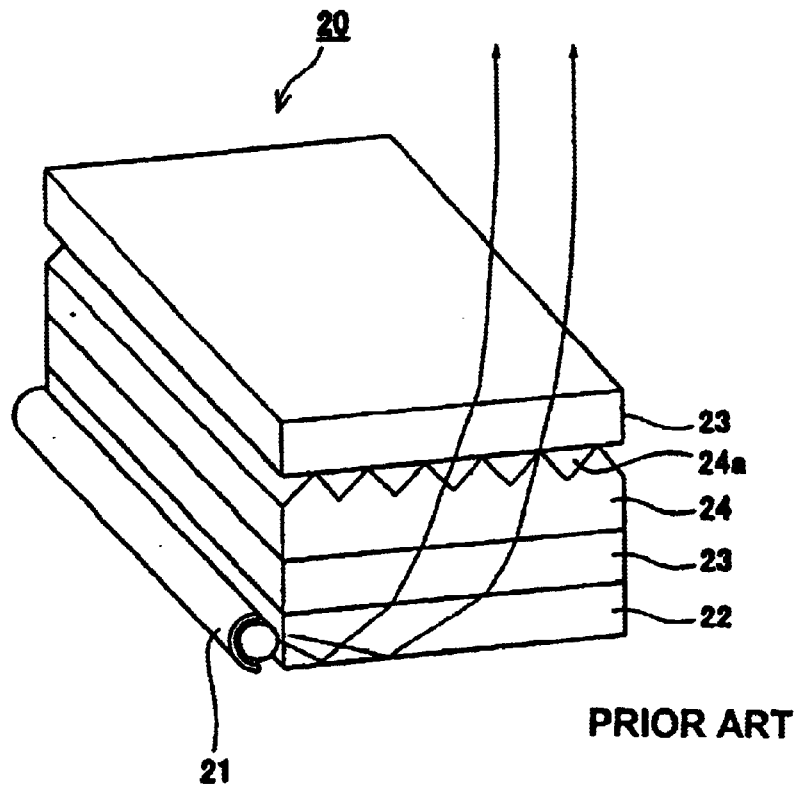
FIG. 9 diagrammatically shows a perspective view of a structure of another common backlight unit.
Figure 10:
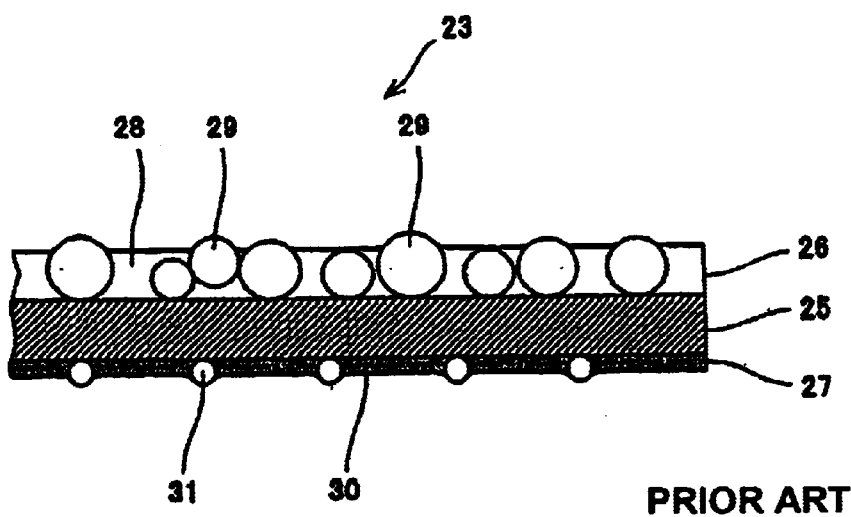
FIG. 10 diagrammatically shows a section of a structure of a conventional common light diffusion sheet.

By use of the above-described light diffusion sheet 1 as the light diffusion sheet 23 shown in FIG. 8 into the backlight unit 20 in which the light guide plate 22, the light diffusion sheet 23 and the prism sheet 24 are laminated and in which light beams (ray) emitted from the lamp 21 positioned beside the light guide plate 22 are uniformly diffused to be transmitted to a polarizing film (not shown) located in an upper position, the causes (e.g., whitening, irregular reflection and drops in brightness in the area near the lamp 21) of the degradation of the backlight unit can be eliminated and, in consequence, nonuniformity in the brightness of the liquid crystal display employing the backlight unit 20 can be reduced. The light diffusion sheet 1, supra, may be used as the light diffusion sheet 23 which is laminated on the surface of the prism sheet 24 as shown in FIG. 9.

Since the wear resistance of the rear face of the light diffusion sheet 1 is increased by the binder 7, it is very easy to handle the sheet 1 when assembling the backlight unit 20.

Effects of the Invention

According to the invention, even when a plurality of light diffusion sheets are stacked together on top of one another during manufacture, delivery, storage and other occasions, possible occurrence of scratch defects in the rear faces of the sheets can be prevented and handling of the sheets becomes easy, so that the attachment of the sheets to a backlight unit can be facilitated.

In the light diffusion sheet of the invention, possible occurrence of scratch defects in the sticking-inhibiting layer is prevented, so that degradation of optical properties such as interference of light beam transmission caused by scratches in the sticking-inhibiting layer can be avoided, thereby maintaining the desired optical properties.

In addition, by use of a wax for the light diffusion sheet of the invention, light beams passing through the light diffusion layer can be uniformly diffused utilizing optical refraction and reflection at the interface of the wax. Since the wax dispersed in the binder prevents occurrence of scratches in the light diffusion sheet, damage which is possibly caused in the contact surfaces of a plurality of light diffusion sheets when stacked together on top of one another can be avoided.

Further, the apparent crystallinity of the light diffusion sheet of the invention is increased by dispersing the micro inorganic filler in the light diffusion sheet, whereby the heat resistance of the light diffusion sheet can be increased to restrict the deflection of the sheet caused by heat generation when the lamp is lit.

What is claimed is:

1. A light diffusion sheet comprising:
   a transparent base sheet;
   a light diffusion layer laminated on a surface of the base sheet and containing beads and wax particles dispersed within a binder; and
   a sticking-inhibiting layer laminated on a rear face of the base sheet,
   wherein the binder of the light diffusion layer contains a thermosetting resin and the sticking-inhibiting layer is a resin layer containing an ionizing radiation-curable resin.

2. A light diffusion sheet according to claim 1, wherein said sticking-inhibiting layer is a flat resin layer.

3. A light diffusion sheet according to claim 1, wherein said sticking-inhibiting layer contains beads dispersed therein.

4. A light diffusion sheet according to claim 1, wherein said ionizing radiation-curable resin is an ultraviolet-curable resin.

5. A light diffusion sheet according to claim 4, wherein said ultraviolet-curable resin has a glass transition temperature (Tg) of 20° C. to 50° C.

6. A light diffusion sheet according to claim 4, wherein said ultraviolet-curable resin has a glass transition temperature (Tg) of 50° C. to 150° C.

7. A light diffusion sheet according to claim 1, wherein said sticking-inhibiting layer further contains wax particles dispersed within the resin layer.

8. A light diffusion sheet according to claim 1, wherein the particles of said wax project from the surface of the binder.

9. A light diffusion sheet according to claim 7, wherein the particles of said wax project from the surface of the resin layer.

10. A light diffusion sheet according to claim 1, wherein the average particle size of the wax is within the range of from 1 to 25 $\mu$m.

11. A light diffusion sheet according to claim 7, wherein the average particle size of the wax is within the range of from 1 to 25 $\mu$m.

12. A light diffusion sheet according to claim 1, wherein the amount of the wax contained in the light diffusion layer is within the range of from 0.5 to 5 wt % based on the weight of the binder.

13. A light diffusion sheet according to claim 7, wherein the amount of the wax contained in the sticking-inhibiting layer is within the range of from 0.5 to 5 wt % based on the weight of the resin layer.

14. A light diffusion sheet according to claim 1, wherein said wax is selected from the group consisting of polyethylene wax, polypropylene wax, polytetrafluoroethylene wax and the combinations of these waxes.

15. A light diffusion sheet according to claim 7, wherein said wax in the sticking-inhibiting layer is selected from the group consisting of polyethylene wax, polypropylene wax, polytetrafluoroethylene wax and the combinations of these waxes.

16. A light diffusion sheet according to claim 1, wherein said light diffusion layer further contains micro inorganic filler particles dispersed within the binder.

17. A light diffusion sheet according to claim 1, wherein said sticking-inhibiting layer further contains micro inorganic filler particles dispersed within the resin layer.

18. A light diffusion sheet according to claim 16, wherein the average particle diameter of said micro inorganic filler is within the range of from 5 nm to 1 $\mu$m.

19. A light diffusion sheet according to claim 17, wherein the average particle diameter of said micro inorganic filler is within the range of from 5 nm to 1 $\mu$m.

20. A light diffusion sheet according to claim 16, wherein the amount of the micro inorganic filler is 10 to 500 parts by weight per 100 parts of the polymer of the light diffusion layer or the sticking-inhibiting layer.

21. A light diffusion sheet according to claim 17, wherein the amount of the micro inorganic filler is 10 to 500 parts by weight per 100 parts of the polymer of the light diffusion layer or the sticking-inhibiting layer.

22. A light diffusion sheet according to claim 16, wherein said micro inorganic filler is colloidal silica.

23. A light diffusion sheet according to claim 17, wherein said micro inorganic filler is colloidal silica.

24. A backlight unit for use in a liquid crystal display, the unit comprising a lamp; a light guide plate disposed beside the lamp for guiding light beams to a front side of the light guide plate, the light beams having been emitted from the lamp; and the light diffusion sheet of claim 1 and disposed on the front side of the light guide plate.

* * * * *